(12) United States Patent
Peng et al.

(10) Patent No.: US 10,729,133 B2
(45) Date of Patent: Aug. 4, 2020

(54) CORNFIELD HERBICIDAL COMPOSITION AND APPLICATION THEREOF

(71) Applicant: QINGDAO KINGAGROOT RESISTANT WEED MANAGEMENT CO., LTD., Qindao, Shandong (CN)

(72) Inventors: Xuegang Peng, Shandong (CN); Jinxin Wang, Shandong (CN); Tao Jin, Shandong (CN); Jingyuan Zhang, Shandong (CN); Qi Cui, Shandong (CN); Xiaoqi Chen, Shandong (CN)

(73) Assignee: Qingdao Kingagroot Resistant Weed Management Co., Qingdao, Shandong (CN)

( * ) Notice: Subject to any disclaimer, the term of this patent is extended or adjusted under 35 U.S.C. 154(b) by 0 days.

(21) Appl. No.: 16/093,216

(22) PCT Filed: Mar. 15, 2017

(86) PCT No.: PCT/CN2017/076781
§ 371 (c)(1),
(2) Date: Oct. 12, 2018

(87) PCT Pub. No.: WO2017/177784
PCT Pub. Date: Oct. 19, 2017

(65) Prior Publication Data
US 2019/0124925 A1 May 2, 2019

(30) Foreign Application Priority Data

Apr. 15, 2016 (CN) .......................... 2016 1 0237833

(51) Int. Cl.
| | |
|---|---|
| A01N 43/56 | (2006.01) |
| A01N 43/70 | (2006.01) |
| A01N 37/22 | (2006.01) |
| A01N 43/40 | (2006.01) |
| A01N 43/707 | (2006.01) |
| A01N 43/88 | (2006.01) |
| A01N 47/36 | (2006.01) |
| A01N 37/26 | (2006.01) |
| A01N 37/40 | (2006.01) |
| A01N 41/06 | (2006.01) |
| A01N 43/76 | (2006.01) |
| A01N 43/80 | (2006.01) |
| A01N 43/78 | (2006.01) |
| A01N 25/32 | (2006.01) |
| A01N 43/653 | (2006.01) |
| A01N 37/10 | (2006.01) |
| A01N 37/34 | (2006.01) |

(52) U.S. Cl.
CPC .............. *A01N 43/56* (2013.01); *A01N 25/32* (2013.01); *A01N 37/10* (2013.01); *A01N 37/22* (2013.01); *A01N 37/26* (2013.01); *A01N 37/34* (2013.01); *A01N 37/40* (2013.01); *A01N 41/06* (2013.01); *A01N 43/40* (2013.01); *A01N 43/653* (2013.01); *A01N 43/70* (2013.01); *A01N 43/707* (2013.01); *A01N 43/76* (2013.01); *A01N 43/78* (2013.01); *A01N 43/80* (2013.01); *A01N 43/88* (2013.01); *A01N 47/36* (2013.01)

(58) Field of Classification Search
CPC ........ A01N 25/04; A01N 25/12; A01N 25/30; A01N 43/70; A01N 43/707; A01N 47/36; A01N 37/22; A01N 37/26; A01N 37/40; A01N 43/40; A01N 43/78; A01N 41/06; A01N 43/56; A01N 43/76; A01N 43/80; A01N 43/88; A01N 25/32; A01N 37/10; A01N 37/34; A01N 43/653
USPC ......................................................... 504/132
See application file for complete search history.

(56) References Cited

FOREIGN PATENT DOCUMENTS

| | | |
|---|---|---|
| CN | 102245029 A | 11/2011 |
| CN | 105230629 A | 1/2016 |

(Continued)

OTHER PUBLICATIONS

Shukla et al. ("Basis of Crop Selectivity and Weed Resistance of Triazine Herbicides", 2008, chapter 9, pp. 111-118).*

(Continued)

*Primary Examiner* — Johann R Richter
*Assistant Examiner* — Courtney A Brown
(74) *Attorney, Agent, or Firm* — Leydig, Voit & Mayer, Ltd.

(57) ABSTRACT

A cornfield herbicidal composition comprising pyrazolone compounds and an application thereof is provided. The cornfield herbicidal composition comprises an herbicidally effective amount of an active ingredient A, an active ingredient B, and a safener compound C, wherein the active ingredient A is a compound of the formula (I); the active ingredient B is selected from one or more of the following compounds: triazines, nitriles, sulfonylureas, pyridine carboxylic acids, benzyl carboxylic acids, bentazone, amides, pyridines and amicarbazone; and the safener compound C is selected from one or more of the following compounds: C1 isoxadifen-ethyl, C2 cyprosulfamide, C3 mefenpyr-diethyl, C4 cloquintocet-mexyl, C5 gibberellic acid, C6 furilazole and C7 N-(2-methoxybenzoyl)-4-[(methylaminocarbonyl)amino]benzenesulfonamide. The composition can effectively prevent and remove weeds in the cornfield, and has the characteristics of extending the weed control spectrum, reducing the application dose, being safe for crops, being able to remove resistant weeds and the like.

18 Claims, No Drawings

(56) References Cited

FOREIGN PATENT DOCUMENTS

WO     WO 2008/093840 A1    8/2008
WO     WO-2017219806 A1 * 12/2017  ............. A01N 37/48

OTHER PUBLICATIONS

International Bureau, International Search Report in International Application No. PCT/CN2017/076781, dated Jun. 19, 2017.

* cited by examiner

CORNFIELD HERBICIDAL COMPOSITION AND APPLICATION THEREOF

CROSS-REFERENCE TO RELATED APPLICATIONS

This patent application is the U.S. National Stage of International Patent Application No. PCT/CN2017/076781, filed Mar. 15, 2017, which claims the benefit of Chinese Patent Application No. 201610237833.9, filed Apr. 15, 2016, which are each incorporated by reference.

TECHNICAL FIELD

The present invention belongs to the technical field of pesticides, and particularly relates to a cornfield herbicidal composition comprising pyrazolone compounds and an application thereof.

BACKGROUND ART

Chemical control of weed is a most economical and effective means for controlling weeds in farmlands. However, continuously use of a single chemical herbicide or chemical herbicides having a single functional mechanism at a high dosage for a long period of time is likely to cause problems associated with evolved drug resistance and tolerance of weeds. Well complexing or formulating of herbicidal compounds can achieve the following advantages: expanding weed spectrum, improving weed control effect, and delaying occurrence and development of drug resistance and tolerance of weeds, and thus is one of the most effective means to solve the above problems.

The hydroxyphenyl pyruvate dioxygenase (HPPD) is another novel herbicide following the acetyl CoA carboxylase (ACCase) inhibitor, the acetolactate synthase (ALS) inhibitor and the Protox inhibitor etc. The HPPD inhibitor has a broad spectrum of herbicidal activity, can be used before and after budding, and may cause albinism and death of weeds. Although the HPPD inhibitor result in similar poisoning symptoms to that of carotenoid bio-inhibitors, it is markedly different from the known carotenoid bio-inhibitors in terms of chemical properties such as polarity and ionization degree etc.

The risk of resistance of weeds to HPPD inhibitor herbicides is significantly reduced compared to that of ACCase inhibitors, and HPPD inhibitor herbicides and commonly used ACCase inhibitors or ALS inhibitors having other mechanisms of action do not have cross-resistance caused by target resistance.

Herbicide safener, also known as antidote or protectant, is a chemical substance with unique properties. Herbicide safener selectively protects crops from damage caused by herbicides without affecting the activity of the herbicides against target weeds, thereby enhancing the tolerance of crops to the herbicides and increasing the safety of herbicides for crops. Herbicide safeners have been extensively researched in the United States, Germany, Switzerland, Japan, Canada, Russia, South Korea, and Hungary, while this research started late and did not begin until the late 1980s in China.

Herbicide safeners can be divided into dichloroacetamides, oxime ethers, carboxylic acid derivatives, sulfonic acid derivatives, oxazoles, thiazoles and other heterocyclic compounds, ketones and derivatives thereof etc., according to category of compounds; the herbicide safeners can be divided into naphthalic anhydrides, dichloroacetamides, oxime ethers, heterocyclic compounds, sulfonylureas (sulfonamides), plant growth regulators, herbicides and fungicides etc., according to structure; and herbicide safeners can be divided into combination types, decomposition types, antagonism types, compensation types and the like, according to the action mode and action mechanism.

With the wide application of herbicides, the problem of damages caused by herbicide continues to emerge, and there is an urgent need for herbicide safeners. Herbicide safeners include amides, carbamates, phenoxycarboxylic acids, aryloxyphenoxypropionates, sulfonylureas, sulfonamides, imidazolinones, cyclohexanediones, isoxazoldiones, s-triazines, and the like. The protected crops mainly include corn, rice, sorghum, rye, cotton, soybean, and so forth.

At present, the herbicides used in cornfields mainly include a few of products such as nicosulfuron and mesotrione etc. These two herbicides have been applied on corn for many years, and the resistance of weeds to nicosulfuron has become prominent. Mesotrione has a low activity, a narrow weed controlling spectrum, and especially a poor effect on controlling *Setaria* weeds. Accordingly, products which have a high safety and a broad weed controlling spectrum and can be used to solve the problem associated with resistant weeds are urgently needed.

THE CONTENTS OF THE INVENTION

In order to solve the above existing problems in the prior art, the present invention provides a cornfield herbicidal composition comprising pyrazolone compounds and an application thereof, which composition can effectively prevent and remove weeds, such as *Echinochloa crusgalli*, *Digitaria sanguinalis* and *Setaria viridis*, in the cornfield, and has the characteristics of extending the weed control spectrum, reducing the application dose, being safe for crops, being able to remove resistant weeds and the like.

The present invention provides a cornfield herbicidal composition comprising an herbicidally effective amount of an active ingredient A, an active ingredient B, and a safener compound C,
wherein the active ingredient A is a compound of the formula

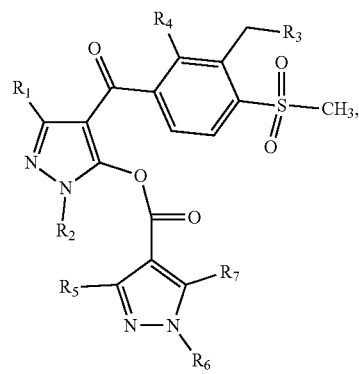

wherein
$R_1$ is hydrogen atom, methyl, ethyl, or cyclopropyl;
$R_2$ is methyl, ethyl, or isopropyl;
$R_3$ is ethoxy, 2-fluoroethoxy, 2,2-difluoroethoxy, or 2,2,2-trifluoroethoxy;
$R_4$ is chlorine atom or methyl; and
$R_5$, $R_6$ and $R_7$ are hydrogen atom, alkyl, alkoxy, halogen, halogen-substituted alkyl or a halogen-substituted alkoxy;

the active ingredient B is selected from one or more of the following compounds:
1) triazines: atrazine, metribuzin, terbuthylazine;
2) nitriles: bromoxynil, bromoxynil octanoate, iodobenzonitrile;
3) sulfonylureas: nicosulfuron, halosulfuron-methyl, foramsulfuron, rimsulfuron;
4) pyridine carboxylic acids: fluroxypyr, fluroxypyr-mepthyl, halauxifen-methyl, triclopyr, clopyralid;
5) benzyl carboxylic acids: dicamba;
6) bentazone;
8) amides: acetochlor, butachlor, alachlor, propisochlor, metolachlor;
9) pyridines: diflufenican, picolinafen;
10) amicarbazone;

The safener compound C is selected from one or more of the following compounds: C1: isoxadifen-ethyl (CAS number: 163520-33-0); C2: cyprosulfamide (CAS number: 221667-31-8); C3: mefenpyr-diethyl (CAS number: 135590-91-9); C4: cloquintocet-mexyl (CAS number: 77-06-5); C5: gibberellic acid (CAS number: 99607-70-2); C6: furilazole (CAS number: 121776-33-8); and C7: N-(2-methoxybenzoyl)-4[(methylaminocarbonyl)amino]benzenesulfonamide.

Preferably, in the active ingredient A, $R_1$ is hydrogen atom; $R_2$ is methyl or ethyl; $R_3$ is ethoxy, 2-fluoroethoxy, 2,2-difluoroethoxy or 2,2,2-trifluoroethoxy; $R_4$ is chlorine atom; $R_5$, $R_6$, $R_7$ are hydrogen atom, alkyl, alkoxy, halogen, halogen-substituted alkyl or halogen-substituted alkoxy; and the active ingredient B is one or more of atrazine, metribuzin, terbuthylazine, bromoxynil octanoate, nicosulfuron, halosulfuron-methyl, fluroxypyr, halauxifen-methyl, dicamba, bentazone, butachlor, propisochlor, s-metolachlor, diflufenican, and amicarbazone; the safener compound C is selected from one or more of isoxadifen-ethyl, cyprosulfamide, mefenpyr-diethyl and furilazole.

More preferably, in the active ingredient A, $R_1$ is hydrogen atom; $R_2$ is methyl or ethyl; $R_3$ is ethoxy, 2,2-difluoroethoxy or 2,2,2-trifluoroethoxy; $R_4$ is chlorine atom; $R_5$ is methyl; $R_6$ is methyl; and $R_7$ is hydrogen atom.

Wherein, the weight ratio of A, B and C of the herbicidal composition is 1-100: 1-100: 1-100, preferably the weight ratio of A, B and C is 1-30: 1-30: 1-30, more preferably, the weight ratio of A, B and C is 1-20: 1-20: 1-20. A synergistic effect can be achieved by mixing A with the active ingredient B within the defined weight ratio ranges, and the safener compound C provides well improved safety for the crops.

The A, B and C together account for 1-95%, preferably 10-80% of the total weight of the herbicidal composition. In general, the herbicidal composition of the present invention comprises from 1 to 95 parts by weight of the active ingredients and from 5 to 99 parts by weight of a conventional pesticide adjuvant.

The conventional adjuvant in the composition according to the invention may be a carrier, a surfactant and the like.

The term "carrier" herein refers to an organic or inorganic, natural or synthetic substance, which facilitates the application of the active ingredients. In general, the carrier is inert and must be agriculturally acceptable, especially is acceptable to a plant to be treated. The carrier may be a solid, such as clay, a natural or synthetic silicate, silica, a resin, a wax, a solid fertilizer and so on; or a liquid such as water, an alcohol, a ketone, a petroleum fraction, an aromatic or paraffinic hydrocarbon, a chlorohydrocarbon, liquefied gas and so on.

The surfactant, which may be ionic or non-ionic, can include an emulsifier, a dispersant or a wetting agent. Examples which may be mentioned are a salt of polyacrylic acid, a salt of lignosulfonic acid, a salt of phenolsulfonic acid or of naphthalenesulfonic acid, a polymer of ethylene oxide with an aliphatic alcohol or with an aliphatic acid or with an aliphatic amine or with a substituted phenol (in particular, an alkylphenol or an arylphenol), a sulfosuccinate, a taurine derivative (especially an alkyl taurate) and a phosphoric ester of an alcohol or of a polyhydroxyethylated phenol, an alkyl sulfonate, an alkylaryl sulfonate, an alkyl sulfate, a laurylether sulfate, a fatty alcohol sulfate, a sulfated hexadecanol, heptadecanol and octadecanol and a sulfated fatty alcohol polyglycol ether, and further include a condensate of naphthalene or naphthalenesulfonic acid with phenol and formaldehyde, polyoxyethylene octylphenyl ether, ethoxylated isooctylphenol, octylphenol or nonylphenol, a polyethylene glycol alkylphenyl ether, a polyethylene glycol tributylphenyl ether, a polyethylene glycol tristearylphenyl ether, a alkylaryl polyether alcohol, an alcohol and fatty alcohol/ethylene oxide condensate, ethoxylated castor oil, a polyoxyethylene alkyl ether, an ethoxylated polyoxypropylene, a lauryl alcohol polyglycol ether acetal, a sorbitol ester, a lignin sulfite waste liquid, a protein, a denatured protein, a polysaccharide (e.g., methylcellulose), a hydrophobic modified starch, a polyvinyl alcohol, a polycarboxylate, a polyalkoxylate, a polyvinylamine, a polyvinylpyrrolidone, and a copolymer thereof. At least one surfactant may be required to facilitate dispersion of the active ingredient in water and proper application thereof to a plant.

The composition can also comprise various other components, such as a protective colloid, an adhesive, a thickener, a thixotropic agent, a penetrant, a stabilizer, a chelating agent, a dye, a colorant or a polymer.

The composition of the present invention may be diluted prior to use or used directly by users. The compositon can be prepared through a conventional processing method, that is, the active ingredient(s) is mixed with a liquid solvent or a solid carrier, and then one or more of the surfactants such as a dispersant, a stabilizer, a wetting agent, an adhesive, or a defoaming agent, etc. are added.

A specific formulation of the herbicidal composition may be a wettable powder, a dispersible oil suspension, a suspension, a suspoemulsion, an emulsifiable concentrate, a water-dispersible granule (a dry suspension), an aqueous emulsion, or a microemulsion.

The technical material, the safener, the solvent and the emulsifier in the above formula are added to a container for preparing a mother liquor to prepare a homogenous oil phase, then uniformly mixed with the deionized water and the antifreezing agent, etc., and injected into a container for preparing product and mixed under high-speed stirring to prepare the transparent or semitransparent microemulsion of the composition of the present invention.

In short, the composition of the present invention can be mixed with solid and liquid additives conventionally used in formulations of the prior art.

The composition according to the invention can be sprayed to a leaf of a plant to be treated, i.e., the composition of the invention can be applied to a weed, especially to the weed which is harmful to the growth of crops, and particularly to a surface of the weed from where the weed invades or is likely to invade crops.

When the herbicidal composition of the present invention is applied, an unexpected synergistic effect is achieved, and the herbicidal activity is greater than a single or the sum of the predicted activity of each herbicide. The synergistic effect is manifested by a reduced application rate, a broader weed control spectrum, and faster and more durable weeding action, all of which are required for weed control practices. In regarding to the described characteristics, the composition is significantly superior to the existing herbicides in the art.

The herbicidal composition of the present invention also has following advantages:

(1) The composition of the present invention is environmentally friendly cornfield herbicidal composition, which is easily degraded in the environment and is safe for both current corn and succeeding crops.

(2) The herbicidal composition of the invention is of low cost and convenient in usage, and has great economic and social benefit for popularization and application thereof.

(3) As compared with the prior art, the herbicidal composition of the present invention can prevent and remove not only non-resistant Gramineae weeds but also resistant Gramineae weeds to ALS inhibitors such as *Echinochloa crusgalli* and *Setaria viridis*, which is an effective solution for the management of weed resistance in cornfields.

SPECIFIC MODE FOR CARRYING OUT THE INVENTION

The following examples provided are not intend to limit the invention, but merely to illustrate how the invention is carried out. These examples show particularly significant effectiveness to certain weeds.

A. Examples

The active ingredient A is one of compounds of the formula

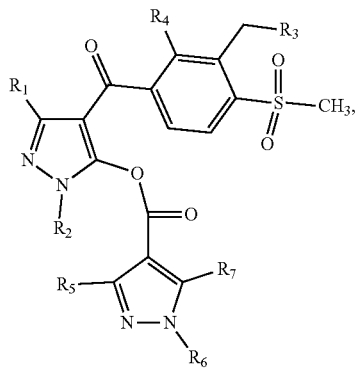

when $R_1$ is hydrogen, $R_2$ is ethyl, $R_3$ is 2,2,2-trifluoroethoxy, $R_4$ is chlorine atom, $R_5$ is methyl, $R_6$ is methyl, and $R_7$ is hydrogen atom, the compound is $A_1$;

when $R_1$ is hydrogen, $R_2$ is methyl, $R_3$ is 2,2-difluoroethoxy, $R_4$ is chlorine atome, $R_5$ is methyl, $R_6$ is methyl, and $R_7$ is hydrogen atom, the compound is $A_2$;

when $R_1$ is hydrogen, $R_2$ is ethyl, $R_3$ is ethoxy, $R_4$ is chlorine atom, $R_5$ is methyl, $R_6$ is methyl, and $R_7$ is hydrogen atom, the compound is $A_3$.

1) Dispersible Oil Suspension

When the active ingredient B is atrazine, and the safener compound C is isoxadifen-ethyl, The composition is: 6% $A_1$+50% atrazine+1% isoxadifen-ethyl+5% phenemylphenol polyoxyethylene ether phosphate ester triethanolamine salt as a dispersant+5% polyoxyethylene aliphatate as an emulsifying agent+8% castor oil polyoxyethylene ether as an emulsifying agent+2% organobentonite as a thickening agent+methyl oleate as balance.

2) Dispersible Oil Suspension

When the active ingredient B is atrazine, and the safener compound C is cyprosulfamide, The composition is: 3% $A_2$+25% atrazine+1.5% cyprosulfamide+5% phenemylphenol polyoxyethylene ether phosphate ester triethanolamine salt as a dispersant+5% polyoxyethylene aliphatate as an emulsifying agent+8% castor oil polyoxyethylene ether as an emulsifying agent+2% organobentonite as a thickening agent+methyl oleate as balance.

3) Dispersible Oil Suspension

When the active ingredient B is metribuzin, and the safener compound C is isoxadifen-ethyl, The composition is: 6% $A_3$+20% metribuzin+0.75% isoxadifen-ethyl+5% phenemylphenol polyoxyethylene ether phosphate ester triethanolamine salt as a dispersant+5% polyoxyethylene aliphatate as an emulsifying agent+8% castor oil polyoxyethylene ether as an emulsifying agent+2% organobentonite as a thickening agent+methyl oleate as balance.

4) Dispersible Oil Suspension

When the active ingredient B is metribuzin, and the safener compound C is cyprosulfamide.

The composition is: 3% $A_1$+10% metribuzin+0.25% cyprosulfamide+5% phenemylphenol polyoxyethylene ether phosphate ester triethanolamine salt as a dispersant+5% polyoxyethylene aliphatate as an emulsifying agent+8% castor oil polyoxyethylene ether as an emulsifying agent+2% organobentonite as a thickening agent+methyl oleate as balance.

5) Dispersible Oil Suspension

When the active ingredient B is terbuthylazine, and the safener compound C is cyprosulfamide.

The composition is: 6% $A_3$+50% terbuthylazine+6% cyprosulfamide+5% phenemylphenol polyoxyethylene ether phosphate ester triethanolamine salt as a dispersant+5% polyoxyethylene aliphatate as an emulsifying agent+8% castor oil polyoxyethylene ether as an emulsifying agent+2% organobentonite as a thickening agent+methyl oleate as balance.

6) Dispersible Oil Suspension

When the active ingredient B is diflufenican, and the safener compound C is mefenpyr-diethyl.

The composition is: 12% $A_1$+20% diflufenican+4% mefenpyr-diethyl+5% phenemylphenol polyoxyethylene ether phosphate ester triethanolamine salt as a dispersant+5% polyoxyethylene aliphatate as an emulsifying agent+8% castor oil polyoxyethylene ether as an emulsifying agent+2% organobentonite as a thickening agent+methyl oleate as balance.

7) Dispersible Oil Suspension

When the active ingredient B is nicosulfuron, and the safener compound C is isoxadifen-ethyl, The composition is: 6% $A_1$+2% nicosulfuron+3% isoxadifen-ethyl+5% phenemylphenol polyoxyethylene ether phosphate ester triethanolamine salt as a dispersant+5% polyoxyethylene aliphatate as an emulsifying agent+8% castor oil polyoxyethylene ether as an emulsifying agent+2% organobentonite as a thickening agent+methyl oleate as balance.

8) Dispersible Oil Suspension

When the active ingredient B is halosulfuron-methyl, and the safener compound C is furilazole, The composition is: 3% $A_1$+1.5% halsulfuron-methyl+1% furilazole+5% phenemylphenol polyoxyethylene ether phosphate ester triethanolamine salt as a dispersant+5% polyoxyethylene aliphatate as an emulsifying agent+8% castor oil polyoxyethylene ether as an emulsifying agent+2% organobentonite as a thickening agent+methyl oleate as balance.

9) Dispersible Oil Suspension

When the active ingredient B is dicamba, and the safener compound C is mefenpyr-diethyl, The composition is: 6% $A_2$+10% dicamba+3% mefenpyr-diethyl+5% phenemylphenol polyoxyethylene ether phosphate ester triethanolamine salt as a dispersant+5% polyoxyethylene aliphatate as an emulsifying agent+8% castor oil polyoxyethylene ether as an emulsifying agent+2% organobentonite as a thickening agent+methyl oleate as balance.

10) Dispersible Oil Suspension

When the active ingredient B is bentazone, and the safener compound C is mefenpyr-diethyl, The composition is: 3% $A_1$+15% bentazone+1% mefenpyr-diethyl+5% phenemylphenol polyoxyethylene ether phosphate ester triethanolamine salt as a dispersant+5% polyoxyethylene aliphatate as an emulsifying agent+8% castor oil polyoxyethylene ether as an emulsifying agent+2% organobentonite as a thickening agent+methyl oleate as balance.

11) Dispersible Oil Suspension

When the active ingredient B is fluroxypyr, and the safener compound C is isoxadifen-ethyl, The composition is: 1.5% $A_3$+2% fluroxypyr+0.75% isoxadifen-ethyl+5% phenemylphenol polyoxyethylene ether phosphate ester triethanolamine salt as a dispersant+5% polyoxyethylene aliphatate as an emulsifying agent+8% castor oil polyoxyethylene ether as an emulsifying agent+2% organobentonite as a thickening agent+methyl oleate as balance.

12) Dispersible Oil Suspension

When the active ingredient B is bromoxynil octanoate, and the safener compound C is cyprosulfamide, The composition is: 6% $A_1$+15% bromoxynil octanoate+6% cyprosulfamide+5% phenemylphenol polyoxyethylene ether phosphate ester triethanolamine salt as a dispersant+5% polyoxyethylene aliphatate as an emulsifying agent+8% castor oil polyoxyethylene ether as an emulsifying agent+2% organobentonite as a thickening agent+methyl oleate as balance.

13) Suspension

When the active ingredient B is atrazine, and the safener compound C is cyprosulfamide, The composition is: 6% $A_2$+50% atrazine+3% cyprosulfamide+5% sodium lignosulfonate as a dispersant+2% Nekal as wetting agent+0.3% xanthan gum as a thickening agent+5% glycerol as an antifreezing agent+water as balance.

The equipments: a mixing tank, a colloid mill, a sand mill, and a shearer etc.

The process: all of the materials were fed into the mixing tank and mixed under stirring, introduced into the colloid mill, then subjected to 3-grade grinding in the sand mill, and finally sheared uniformly in the shearer to obtain the product.

14) Suspension

When the active ingredient B is diflufenican, and the safener compound C is mefenpyr-diethyl, The composition is: 6% $A_3$+10% diflufenican+1.5% mefenpyr-diethyl+5% sodium lignosulfonate as a dispersant+2% Nekal as wetting agent+0.3% xanthan gum as a thickening agent+5% glycerol as an antifreezing agent+water as balance.

The equipments: a mixing tank, a colloid mill, a sand mill, and a shearer etc.

The process: all of the materials were fed into the mixing tank and mixed under stirring, introduced into the colloid mill, then subjected to 3-grade grinding in the sand mill, and finally sheared uniformly in the shearer to obtain the product.

15) Suspension

When the active ingredient B is terbuthylazine, and the safener compound C is cyprosulfamide, The composition is: 6% $A_1$+50% terbuthylazine+6% cyprosulfamide+5% sodium lignosulfonate as a dispersant+2% Nekal as wetting agent+0.3% xanthan gum as a thickening agent+5% glycerol as an antifreezing agent+water as balance.

The equipments: a mixing tank, a shearer, a colloid mill, and a sand mill etc.

The process: $A_1$, terbuthylazine, cyprosulfamide and the adjuvants etc. were fed into the mixing tank and mixed under stirring, introduced into the colloid mill, then subjected to 3-grade grinding in the sand mill to obtain the product.

16) Suspension

When the active ingredient B is metribuzin, and the safener compound C is cyprosulfamide, The composition is: 6% $A_1$+20% metribuzin+3% cyprosulfamide+5% sodium lignosulfonate as a dispersant+2% Nekal as wetting agent+0.3% xanthan gum as a thickening agent+5% glycerol as an antifreezing agent+water as balance.

The equipments: a mixing tank, a shearer, a colloid mill, and a sand mill etc.

The process: $A_1$, metribuzin, cyprosulfamide and the adjuvants etc. were fed into the mixing tank and mixed under stirring, introduced into the colloid mill, then subjected to 3-grade grinding in the sand mill to obtain the product.

17) Water-dispersible Granule

When the active ingredient B is atrazine, and the safener compound C is cyprosulfamide, The composition is: 6% $A_1$+50% atrazine+4% cyprosulfamide+10% a naphthalene sulfonate as a dispersant+5% Nekal as wetting agent+1% polyvinyl alcohol as a disintegrant+diatomaceous earth as a filler as balance.

The equipments: a jet mill, a coulter type mixer, a basket granulator, a drying oven, and a screening device etc.

The process: the above materials were mixed uniformly, passed through the jet mill, kneaded, granulated, dried, and finally sieved to obtain a finished product.

18) Water-dispersible Granule

When the active ingredient B is terbuthylazine, and the safener compound C is isoxadifen-ethyl, The composition is: 6% $A_2$+50% terbuthylazine+3% isoxadifen-ethyl+10% a naphthalene sulfonate as a dispersant+5% Nekal as wetting agent+1% polyvinyl alcohol as a disintegrant+diatomaceous earth as a filler as balance.

The equipments: a jet mill, a coulter type mixer, a basket granulator, a drying oven, and a screening device etc.

The process: the above materials were mixed uniformly, passed through the jet mill, kneaded, granulated, dried, and finally sieved to obtain a finished product.

19) Water-dispersible Granule

When the active ingredient B is butachlor, and the safener compound C is isoxadifen-ethyl, The composition is: 6% $A_3$+50% butachlor+6% isoxadifen-ethyl+10% a naphthalene sulfonate as a dispersant+

5% Nekal as wetting agent+1% polyvinyl alcohol as a disintegrant+diatomaceous earth as a filler as balance.

The equipments: a jet mill, a coulter type mixer, a basket granulator, a drying oven, and a screening device etc.

The process: the above materials were mixed uniformly, passed through the jet mill, kneaded, granulated, dried, and finally sieved to obtain a finished product.

20) Water-dispersible Granule

When the active ingredient B is s-metolachlor, and the safener compound C is cyprosulfamide, The composition is: 6% $A_3$+50% s-metolachlor+2% cyprosulfamide+10% a naphthalene sulfonate as a dispersant+5% Nekal as wetting agent+1% polyvinyl alcohol as a disintegrant+diatomaceous earth as a filler as balance.

The equipments: a jet mill, a coulter type mixer, a basket granulator, a drying oven, and a screening device etc.

The process: the above materials were mixed uniformly, passed through the jet mill, kneaded, granulated, dried, and finally sieved to obtain a finished product.

21) Water-dispersible Granule

When the active ingredient B is amicarbazone, and the safener compound C is cyprosulfamide, The composition is: 18% $A_3$+45% amicarbazone+6% cyprosulfamide+10% a naphthalene sulfonate as a dispersant+5% Nekal as wetting agent+1% polyvinyl alcohol as a disintegrant+diatomaceous earth as a filler as balance.

The equipments: a jet mill, a coulter type mixer, a basket granulator, a drying oven, and a screening device etc.

The process: the above materials were mixed uniformly, passed through the jet mill, kneaded, granulated, dried, and finally sieved to obtain a finished product.

B. Efficacy Assays

1) Experimental conditions 1.1) Tested Targets

*Echinochloa crusgalli, Setaria viridis, Chenopodium album, Amaranthus retroflexus* were collected from corn fields in Qingdao of Shandong Province. *Sonchus brachyotus* were collected from corn fields in Shenyang of Liaoning Province. *Rhizoma Cyperi, Convolvulus arvensis* were collected from corn fields in Shangqiu of Henan Province. *Cirsium setosum* were collected from corn fields in Xiantao of Hubei Province.

The above weeds were cultivated by a pot culture method. A 180×140 mm plastic nutritional bowl contained ⅘ topsoil from the field was placed in an enamel pan, wherein the soil had been air-dried and screened and had an initial moisture content of 20%. Full and uniform weed seeds were selected, soaked in warm water at 25° C. for 6 hours, and germinated in a 28° C. biochemical incubator (darkness). The weed seeds that had just germinated were evenly placed on the surface of the soil and then covered with 0.7 cm soil, and cultured in a controllable sunlight greenhouse after being treated with agents. A certain amount of water was added to the enamel pan regularly to keep the soil moist.

1.2) Culture Conditions

The culture was carried out in a controllable sunlight greenhouse at 18 to 30° C., in natural light, and relative humidity of 57% to 72%.

The soil was loam with an organic matter content of 1.63%, a pH value of 7.1, an alkali-hydrolyzable nitrogen of 84.3 mg/kg, a rapidly available phosphorus of 38.5 mg/kg, and a rapidly available potassium 82.1 mg/kg.

1.3) Equipments and Apparatuses

3WP-2000-type Walking Spray Tower (Nanjing Institute of Agricultural Machinery, the Ministry of Agriculture); GA110-type ten thousandth Electronic Balance (Germany); ZDR2000-type Intelligent Data Recorder (Hangzhou Zeda Instrument Co., Ltd.); and SPX-type Intelligent Biochemical Incubator (Ningbo Jiangnan Instrument Factory).

2) Designs of Experiments 2.1) Reagents 2.1.1) Agents for the Experiment

The active ingredient B for use was commercially available technical material, the active ingredient A was produced by our company, referring to the patent CN201511030154.6.

The technical materials were all dissolved in acetone, and diluted with an aqueous solution containing 0.1% emulsifier T-80. The dilution is performed as required.

2.2) Experimental Treatments 2.2.1) Determination of Dosage

A ratio of A to the active ingredient B and amounts thereof in each group depends on the characteristics and toxicity of the two agents, as well as the main application purpose of a corresponding formulation. Based on the pre-tests in this study, the dosage of A and the active ingredient B applied alone and in combination were shown in the tables, and a total 15 groups were designed. Water containing the solvent and emulsifier same with the above groups but free of the agents was used as a blank control.

2.2.2) Repetition of Experiments 3 pots with 20 weed seeds per pot were treated in one treatment with 4 replications per treatment, that is, a total of 60 weeds were treated in one treatment.

2.3) Treatment Method 2.3.1) The Timing and Frequency of the Treatment

The agents were used for only once in the experiment. In the stage of weeds with 2 leaves and 1 core, the weeds were thinned out to maintain 15 weeds per pot and 45 weeds for each treatment, then continued to be cultured to 5-leaves and 1-core stage of *Echinochloa crusgalli* and *Setaria viridis*, and treated.

2.3.2) Equipments and Methods for Aapplying Agents

The well-cultured weeds were evenly placed on a platform with an area of 0.5 m², and a solution of agents was sprayed on the stems and leaves thereof by the 3WP-2000-type walking spray tower at a dosage of 30 kg/ha and at a spray pressure of 0.3 MPa. After all the solution was sprayed, the valve was closed. After 30 seconds, the door of the spray tower was opened, and the nutritional bowl was taken out. Then the valve was opened, and the spray tube was cleaned by spraying 50 ml of water.

3) Experimental Methods

A pot-culture method was employed. For the cultivation of weeds, please refer to the Section 1.1, and "Pesticide guidelines for laboratory bioactivity tests—herbicides". As to a method for applying agents, please refer to the section 2.3.2, that is, a method for treating stems and leaves was employed.

4) Data Investigation and Statistical Analysis 4.1) Investigation Methods

A method for investigating absolute number was employed, wherein whole seedlings of survival weeds were cut off with a blade along the soil surface, and the fresh weight of the weeds was weighed with an analytical balance. For dead weeds, the fresh weight thereof was zero.

4.2) Investigation Timing and Frequency

The investigation was performed after 20 days of the treatment for only once.

4.3) Statistical Analysis of the Data

Theoretical fresh weight inhibition rate of a combination of two active ingredients in each group was calculated by the Gowing method (E0=X+Y−X*Y/100), and then compared with an actually measured inhibition rate (E), thereby effect of the combination (hereafter referred to as combined effect) on weeds was evaluated: the value of E−E0, which was greater than 10%, corresponded to a synergistic effect, the value of E−E0, which was less than −10%, corresponded to an antagonistic effect, and the value of E−E0, which was from −10% to 10%, corresponded to an additional effect. An optimum ratio of the two active ingredients was determined by the actual control effect, characteristics of herbicides, and balance of a corresponding formula.

Wherein, in the formula, X represented the fresh weight inhibition rate of A in a dosage of P, and Y represented the fresh weight inhibition rate of the active ingredient B in a dosage of Q.

The statistical results were shown in the tables below.

TABLE 1

Actual control effect and combined effect of a combination of A and atrazine on weeds (Gowing method)

| agents | dosage of active ingredient (g/hm²) | *Echinochloa crusgalli* | | | *Setaria viridis* | | |
|---|---|---|---|---|---|---|---|
| | | actual fresh weight inhibition rate (%) | theoretical fresh weight inhibition rate (%) | E − E0 | actual fresh weight inhibition rate (%) | theoretical fresh weight inhibition rate (%) | E − E0 |
| $A_1$ | 45 | 54.2 | — | — | 45.7 | — | — |
| | 90 | 82.1 | — | — | 81.6 | — | — |
| | 180 | 100 | — | — | 100 | — | — |
| atrazine | 375 | 20.3 | — | — | 21.3 | — | — |
| | 750 | 34.2 | — | — | 31.4 | — | — |
| | 1500 | 45.1 | — | — | 41.4 | — | — |
| $A_1$ + atrazine | 45 + 375 | 81.2 | 63.5 | 17.7 | 74.8 | 57.3 | 17.5 |
| | 45 + 750 | 93.2 | 69.9 | 23.3 | 79.2 | 62.8 | 16.4 |
| | 45 + 1500 | 95.2 | 74.9 | 20.3 | 86.9 | 68.2 | 18.7 |
| | 90 + 375 | 100 | 85.7 | 14.3 | 100 | 85.5 | 14.5 |
| | 90 + 750 | 100 | 88.2 | 11.8 | 100 | 87.4 | 12.6 |
| | 90 + 1500 | 100 | 90.2 | 9.8 | 100 | 89.2 | 10.8 |
| | 180 + 375 | 100 | 100.0 | 0.0 | 100 | 100.0 | 0.0 |
| | 180 + 750 | 100 | 100.0 | 0.0 | 100 | 100.0 | 0.0 |
| | 180 + 1500 | 100 | 100.0 | 0.0 | 100 | 100.0 | 0.0 |

TABLE 2

Actual control effect and combined effect of a combination of A and metribuzin on weeds (Gowing method)

| agents | dosage of active ingredient (g/hm²) | *Echinochloa crusgalli* | | | *Setaria viridis* | | |
|---|---|---|---|---|---|---|---|
| | | actual fresh weight inhibition rate (%) | theoretical fresh weight inhibition rate (%) | E − E0 | actual fresh weight inhibition rate (%) | theoretical fresh weight inhibition rate (%) | E − E0 |
| $A_1$ | 45 | 42.4 | — | — | 42.1 | — | — |
| | 90 | 83.5 | — | — | 80.3 | — | — |
| | 180 | 100 | — | — | 100 | — | — |
| metribuzin | 112.5 | 22.4 | — | — | 21.5 | — | — |
| | 225 | 32.1 | — | — | 33.6 | — | — |
| | 450 | 42.5 | — | — | 43.5 | — | — |
| $A_1$ + metribuzin | 45 + 112.5 | 71.3 | 55.3 | 16.0 | 75.9 | 54.5 | 21.4 |
| | 45 + 225 | 81.6 | 60.9 | 20.7 | 82.4 | 61.6 | 20.8 |
| | 45 + 450 | 88.7 | 66.9 | 21.8 | 87.3 | 67.3 | 20.0 |
| | 90 + 112.5 | 100 | 87.2 | 12.8 | 100 | 84.5 | 15.5 |
| | 90 + 225 | 100 | 88.8 | 11.2 | 100 | 86.9 | 13.1 |
| | 90 + 450 | 100 | 90.5 | 9.5 | 100 | 88.9 | 11.1 |
| | 180 + 112.5 | 100 | 100.0 | 0.0 | 100 | 100.0 | 0.0 |
| | 180 + 225 | 100 | 100.0 | 0.0 | 100 | 100.0 | 0.0 |
| | 180 + 450 | 100 | 100.0 | 0.0 | 100 | 100.0 | 0.0 |

TABLE 3

Actual control effect and combined effect of a combination of A and terbuthylazine on weeds (Gowing method)

| | | Echinochloa crusgalli | | | Setaria viridis | | |
|---|---|---|---|---|---|---|---|
| agents | dosage of active ingredient (g/hm²) | actual fresh weight inhibition rate (%) | theoretical fresh weight inhibition rate (%) | E − E0 | actual fresh weight inhibition rate (%) | theoretical fresh weight inhibition rate (%) | E − E0 |
| A₁ | 45 | 42.4 | — | — | 39.9 | — | — |
| | 90 | 83.5 | — | — | 81.2 | — | — |
| | 180 | 100 | — | — | 100 | — | — |
| terbuthylazine | 375 | 31.4 | — | — | 25.2 | — | — |
| | 750 | 42.1 | — | — | 30.6 | — | — |
| | 1500 | 51.7 | — | — | 42.3 | — | — |
| A₁ + terbuthylazine | 45 + 375 | 84.2 | 66.6 | 25.0 | 80.1 | 55.0 | 25.1 |
| | 45 + 750 | 91.6 | 72.2 | 26.1 | 89.7 | 58.3 | 31.4 |
| | 45 + 1500 | 98.3 | 88.7 | 11.3 | 93.5 | 65.3 | 28.2 |
| | 90 + 375 | 100 | 90.4 | 9.6 | 100 | 85.9 | 14.1 |
| | 90 + 750 | 100 | 92.0 | 8.0 | 100 | 87.0 | 13.0 |
| | 90 + 1500 | 100 | 100.0 | 0.0 | 100 | 89.2 | 10.8 |
| | 180 + 375 | 100 | 100.0 | 0.0 | 100 | 100.0 | 0.0 |
| | 180 + 750 | 100 | 100.0 | 0.0 | 100 | 100.0 | 0.0 |
| | 180 + 1500 | 100 | 66.6 | 25.0 | 100 | 100.0 | 0.0 |

TABLE 4

Actual control effect and combined effect of a combination of A and bromoxynil octanoate on weeds (Gowing method)

| | | Sonchus brachyotus | | | Convolvulus arvensis | | |
|---|---|---|---|---|---|---|---|
| agents | dosage of active ingredient (g/hm²) | actual fresh weight inhibition rate (%) | theoretical fresh weight inhibition rate (%) | E − E0 | actual fresh weight inhibition rate (%) | theoretical fresh weight inhibition rate (%) | E − E0 |
| A₁ | 45 | 32.1 | — | — | 23.2 | — | — |
| | 90 | 53.2 | — | — | 38.9 | — | — |
| | 180 | 78.8 | — | — | 48.2 | — | — |
| bromoxynil octanoate | 112.5 | 56.2 | — | — | 58.9 | — | — |
| | 225 | 78.3 | — | — | 79.2 | — | — |
| | 450 | 99.2 | — | — | 98.1 | — | — |
| A₁ + bromoxynil octanoate | 45 + 112.5 | 82.3 | 70.3 | 12.0 | 83.2 | 68.4 | 14.8 |
| | 45 + 225 | 96.3 | 85.3 | 11.0 | 94.2 | 84.0 | 10.2 |
| | 45 + 450 | 100 | 99.5 | 0.5 | 100 | 98.5 | 1.5 |
| | 90 + 112.5 | 100 | 79.5 | 20.5 | 100 | 74.9 | 25.1 |
| | 90 + 225 | 100 | 89.8 | 10.2 | 100 | 87.3 | 12.7 |
| | 90 + 450 | 100 | 99.6 | 0.4 | 100 | 98.8 | 1.2 |
| | 180 + 112.5 | 100 | 90.7 | 9.3 | 100 | 78.7 | 21.3 |
| | 180 + 225 | 100 | 95.4 | 4.6 | 100 | 89.2 | 10.8 |
| | 180 + 450 | 100 | 99.8 | 0.2 | 100 | 99.0 | 1.0 |

TABLE 5

Actual control effect and combined effect of a combination of A and nicosulfuron on weeds (Gowing method)

| | | Echinochloa crusgalli | | | Setaria viridis | | |
|---|---|---|---|---|---|---|---|
| agents | dosage of active ingredient (g/hm$^2$) | actual fresh weight inhibition rate (%) | theoretical fresh weight inhibition rate (%) | E − E0 | actual fresh weight inhibition rate (%) | theoretical fresh weight inhibition rate (%) | E − E0 |
| A$_1$ | 45 | 54.2 | — | — | 45.7 | — | — |
| | 90 | 82.1 | — | — | 81.6 | — | — |
| | 180 | 100 | — | — | 100 | — | — |
| nicosulfuron | 15 | 33.1 | — | — | 45.7 | — | — |
| | 30 | 74.5 | — | — | 79.6 | — | — |
| | 60 | 100 | — | — | 100 | — | — |
| A$_1$ + nicosulfuron | 45 + 15 | 88.3 | 69.4 | 18.9 | 85.3 | 70.5 | 14.8 |
| | 45 + 30 | 98.9 | 88.3 | 10.6 | 94.5 | 88.9 | 5.6 |
| | 45 + 60 | 100 | 100.0 | 0.0 | 100 | 100.0 | 0.0 |
| | 90 + 15 | 100 | 88.0 | 12.0 | 100 | 90.0 | 10.0 |
| | 90 + 30 | 100 | 95.4 | 4.6 | 100 | 96.2 | 3.8 |
| | 90 + 60 | 100 | 100.0 | 0.0 | 100 | 100.0 | 0.0 |
| | 180 + 15 | 100 | 100.0 | 0.0 | 100 | 100.0 | 0.0 |
| | 180 + 30 | 100 | 100.0 | 0.0 | 100 | 100.0 | 0.0 |
| | 180 + 60 | 100 | 100.0 | 0.0 | 100 | 100.0 | 0.0 |

TABLE 6

Actual control effect and combined effect of a combination of A and halosulfuron-methyl on weeds (Gowing method)

| | | Rhizoma Cyperi | | |
|---|---|---|---|---|
| agents | dosage of active ingredient (g/hm$^2$) | actual fresh weight inhibition rate (%) | theoretical fresh weight inhibition rate (%) | E − E0 |
| A$_1$ | 45 | 22.8 | — | — |
| | 90 | 31.1 | — | — |
| | 180 | 44.2 | — | — |
| halosulfuron-methyl | 15 | 67.2 | — | — |
| | 30 | 89.3 | — | — |
| | 60 | 100 | — | — |
| A$_1$ + halosulfuron-methyl | 45 + 15 | 89.2 | 74.7 | 14.5 |
| | 45 + 30 | 98.1 | 91.7 | 6.4 |
| | 45 + 60 | 100 | 100.0 | 0.0 |
| | 90 + 15 | 100 | 77.4 | 22.6 |
| | 90 + 30 | 100 | 92.6 | 7.4 |
| | 90 + 60 | 100 | 100.0 | 0.0 |
| | 180 + 15 | 100 | 81.7 | 18.3 |
| | 180 + 30 | 100 | 94.0 | 6.0 |
| | 180 + 60 | 100 | 100.0 | 0.0 |

TABLE 7

Actual control effect and combined effect of a combination of A and fluroxypyr on weeds (Gowing method)

| | | Cirsium setosum | | | Convolvulus arvensis | | |
|---|---|---|---|---|---|---|---|
| agents | dosage of active ingredient (g/hm$^2$) | actual fresh weight inhibition rate (%) | theoretical fresh weight inhibition rate (%) | E − E0 | actual fresh weight inhibition rate (%) | theoretical fresh weight inhibition rate (%) | E − E0 |
| A$_1$ | 45 | 19.3 | — | — | 23.2 | — | — |
| | 90 | 20.4 | — | — | 38.9 | — | — |
| | 180 | 38.5 | — | — | 48.2 | — | — |

TABLE 7-continued

Actual control effect and combined effect of a combination of A and fluroxypyr on weeds (Gowing method)

|  |  | Cirsium setosum | | | Convolvulus arvensis | | |
|---|---|---|---|---|---|---|---|
| agents | dosage of active ingredient (g/hm²) | actual fresh weight inhibition rate (%) | theoretical fresh weight inhibition rate (%) | E − E0 | actual fresh weight inhibition rate (%) | theoretical fresh weight inhibition rate (%) | E − E0 |
| fluroxypyr | 60 | 56.2 | — | — | 63.2 | — | — |
|  | 120 | 79.2 | — | — | 78.2 | — | — |
|  | 240 | 95.4 | — | — | 92.2 | — | — |
| A₁ + fluroxypyr | 45 + 60 | 89.2 | 64.7 | 24.5 | 83.6 | 71.7 | 11.9 |
|  | 45 + 120 | 95.4 | 83.2 | 12.2 | 94.7 | 83.3 | 11.4 |
|  | 45 + 240 | 100 | 96.3 | 3.7 | 100 | 94.0 | 6.0 |
|  | 90 + 60 | 100 | 65.1 | 34.9 | 100 | 77.5 | 22.5 |
|  | 90 + 120 | 100 | 83.4 | 16.6 | 100 | 86.7 | 13.3 |
|  | 90 + 240 | 100 | 96.3 | 3.7 | 100 | 95.2 | 4.8 |
|  | 180 + 60 | 100 | 73.1 | 26.9 | 100 | 80.9 | 19.1 |
|  | 180 + 120 | 100 | 87.2 | 12.8 | 100 | 88.7 | 11.3 |
|  | 180 + 240 | 100 | 97.2 | 2.8 | 100 | 96.0 | 4.0 |

TABLE 8

Actual control effect and combined effect of a combination of A and dicamba on weeds (Gowing method)

|  |  | Chenopodium album | | | Convolvulus arvensis | | |
|---|---|---|---|---|---|---|---|
| agents | dosage of active ingredient (g/hm²) | actual fresh weight inhibition rate (%) | theoretical fresh weight inhibition rate (%) | E − E0 | actual fresh weight inhibition rate (%) | theoretical fresh weight inhibition rate (%) | E − E0 |
| A₁ | 45 | 19.1 | — | — | 23.2 | — | — |
|  | 90 | 30.2 | — | — | 38.9 | — | — |
|  | 180 | 48.7 | — | — | 48.2 | — | — |
| dicamba | 75 | 66.2 | — | — | 64.4 | — | — |
|  | 150 | 85.3 | — | — | 78.9 | — | — |
|  | 300 | 100 | — | — | 92.8 | — | — |
| A₁ + dicamba | 45 + 75 | 87.2 | 72.7 | 14.5 | 83.6 | 72.7 | 10.9 |
|  | 45 + 150 | 100 | 88.1 | 11.9 | 94.7 | 83.8 | 10.9 |
|  | 45 + 300 | 100 | 100.0 | 0.0 | 100 | 94.5 | 5.5 |
|  | 90 + 75 | 100 | 76.4 | 23.6 | 100 | 78.2 | 21.8 |
|  | 90 + 150 | 100 | 89.7 | 10.3 | 100 | 87.1 | 12.9 |
|  | 90 + 300 | 100 | 100.0 | 0.0 | 100 | 95.6 | 4.4 |
|  | 180 + 75 | 100 | 82.7 | 17.3 | 100 | 81.6 | 18.4 |
|  | 180 + 150 | 100 | 92.5 | 7.5 | 100 | 89.1 | 10.9 |
|  | 180 + 300 | 100 | 100.0 | 0.0 | 100 | 96.3 | 3.7 |

TABLE 9

Actual control effect and combined effect of a combination of A and bentazone on weeds (Gowing method)

|  |  | Chenopodium album | | | Rhizoma Cyperi | | |
|---|---|---|---|---|---|---|---|
| agents | dosage of active ingredient (g/hm²) | actual fresh weight inhibition rate (%) | theoretical fresh weight inhibition rate (%) | E − E0 | actual fresh weight inhibition rate (%) | theoretical fresh weight inhibition rate (%) | E − E0 |
| A₁ | 45 | 19.1 | — | — | 22.8 | — | — |
|  | 90 | 30.2 | — | — | 31.1 | — | — |
|  | 180 | 48.7 | — | — | 44.2 | — | — |

TABLE 9-continued

Actual control effect and combined effect of a combination of A and bentazone on weeds (Gowing method)

| | | *Chenopodium album* | | | *Rhizoma Cyperi* | | |
|---|---|---|---|---|---|---|---|
| agents | dosage of active ingredient (g/hm$^2$) | actual fresh weight inhibition rate (%) | theoretical fresh weight inhibition rate (%) | E − E0 | actual fresh weight inhibition rate (%) | theoretical fresh weight inhibition rate (%) | E − E0 |
| bentazone | 150 | 56.5 | — | — | 65.3 | — | — |
| | 300 | 75.9 | — | — | 83.5 | — | — |
| | 600 | 94.3 | — | — | 92.1 | — | — |
| A$_1$ + bentazone | 45 + 150 | 79.3 | 64.8 | 14.5 | 85.2 | 73.2 | 12.0 |
| | 45 + 300 | 92.1 | 80.5 | 11.6 | 97.4 | 87.3 | 10.1 |
| | 45 + 600 | 100 | 95.4 | 4.6 | 100 | 93.9 | 6.1 |
| | 90 + 150 | 85.2 | 69.6 | 15.6 | 100 | 76.1 | 23.9 |
| | 90 + 300 | 100 | 83.2 | 16.8 | 100 | 88.6 | 11.4 |
| | 90 + 600 | 100 | 96.0 | 4.0 | 100 | 94.6 | 5.4 |
| | 180 + 150 | 100 | 77.7 | 22.3 | 100 | 80.6 | 19.4 |
| | 180 + 300 | 100 | 87.6 | 12.4 | 100 | 90.8 | 9.2 |
| | 180 + 600 | 100 | 97.1 | 2.9 | 100 | 95.6 | 4.4 |

TABLE 10

Actual control effect and combined effect of a combination of A and butachlor on weeds (Gowing method)

| | | *Echinochloa crusgalli* | | | *Setaria viridis* | | |
|---|---|---|---|---|---|---|---|
| agents | dosage of active ingredient (g/hm$^2$) | actual fresh weight inhibition rate (%) | theoretical fresh weight inhibition rate (%) | E − E0 | actual fresh weight inhibition rate (%) | theoretical fresh weight inhibition rate (%) | E − E0 |
| A$_1$ | 45 | 54.2 | — | — | 45.7 | — | — |
| | 90 | 82.1 | — | — | 81.6 | — | — |
| | 180 | 100 | — | — | 100 | — | — |
| butachlor | 375 | 2.4 | — | — | 2.7 | — | — |
| | 750 | 3.9 | — | — | 3.8 | — | — |
| | 1500 | 5.4 | — | — | 5.9 | — | — |
| A$_1$ + butachlor | 45 + 375 | 78.9 | 55.3 | 23.6 | 65.7 | 47.2 | 18.5 |
| | 45 + 750 | 82.5 | 56.0 | 26.5 | 70.2 | 47.8 | 22.4 |
| | 45 + 1500 | 83.7 | 56.7 | 27.0 | 76.8 | 48.9 | 27.9 |
| | 90 + 375 | 93.6 | 82.5 | 11.1 | 86.8 | 82.1 | 4.7 |
| | 90 + 750 | 95.9 | 82.8 | 13.1 | 90.8 | 82.3 | 8.5 |
| | 90 + 1500 | 98.9 | 83.1 | 15.8 | 93.2 | 82.7 | 10.5 |
| | 180 + 375 | 100 | 100.0 | 0.0 | 100 | 100.0 | 0.0 |
| | 180 + 750 | 100 | 100.0 | 0.0 | 100 | 100.0 | 0.0 |
| | 180 + 1500 | 100 | 100.0 | 0.0 | 100 | 100.0 | 0.0 |

TABLE 11

Actual control effect and combined effect of a combination of A and s-metolachlor on weeds (Gowing method)

| | | *Echinochloa crusgalli* | | | *Setaria viridis* | | |
|---|---|---|---|---|---|---|---|
| agents | dosage of active ingredient (g/hm$^2$) | actual fresh weight inhibition rate (%) | theoretical fresh weight inhibition rate (%) | E − E0 | actual fresh weight inhibition rate (%) | theoretical fresh weight inhibition rate (%) | E − E0 |
| A$_1$ | 45 | 54.2 | — | — | 45.7 | — | — |
| | 90 | 82.1 | — | — | 81.6 | — | — |
| | 180 | 100 | — | — | 100 | — | — |

TABLE 11-continued

Actual control effect and combined effect of a combination of A and s-metolachlor on weeds (Gowing method)

| agents | dosage of active ingredient (g/hm²) | *Echinochloa crusgalli* | | | *Setaria viridis* | | |
|---|---|---|---|---|---|---|---|
| | | actual fresh weight inhibition rate (%) | theoretical fresh weight inhibition rate (%) | E − E0 | actual fresh weight inhibition rate (%) | theoretical fresh weight inhibition rate (%) | E − E0 |
| s-metolachlor | 375 | 2.5 | — | — | 2.9 | — | — |
| | 750 | 3.4 | — | — | 3.9 | — | — |
| | 1500 | 5.6 | — | — | 6.2 | — | — |
| A₁ + s-metolachlor | 45 + 375 | 77.3 | 55.3 | 22.0 | 66.2 | 47.3 | 18.9 |
| | 45 + 750 | 81.4 | 55.8 | 25.6 | 66.1 | 47.8 | 18.3 |
| | 45 + 1500 | 83.8 | 56.8 | 27.0 | 68.6 | 49.1 | 19.5 |
| | 90 + 375 | 93.2 | 82.5 | 10.7 | 86.7 | 82.1 | 4.6 |
| | 90 + 750 | 95.6 | 82.7 | 12.9 | 86.7 | 82.3 | 4.4 |
| | 90 + 1500 | 96.4 | 83.1 | 13.3 | 86.6 | 82.7 | 3.9 |
| | 180 + 375 | 100 | 100.0 | 0.0 | 100 | 100.0 | 0.0 |
| | 180 + 750 | 100 | 100.0 | 0.0 | 100 | 100.0 | 0.0 |
| | 180 + 1500 | 100 | 100.0 | 0.0 | 100 | 100.0 | 0.0 |

TABLE 12

Actual control effect and combined effect of a combination of A and diflufenican on weeds (Gowing method)

| agents | dosage of active ingredient (g/hm²) | *Echinochloa crusgalli* | | | *Setaria viridis* | | |
|---|---|---|---|---|---|---|---|
| | | actual fresh weight inhibition rate (%) | theoretical fresh weight inhibition rate (%) | E − E0 | actual fresh weight inhibition rate (%) | theoretical fresh weight inhibition rate (%) | E − E0 |
| A₁ | 45 | 54.2 | — | — | 45.7 | — | — |
| | 90 | 82.1 | — | — | 81.6 | — | — |
| | 180 | 100 | — | — | 100 | — | — |
| diflufenican | 75 | 7.2 | — | — | 3.9 | — | — |
| | 150 | 9.4 | — | — | 8.3 | — | — |
| | 300 | 10.3 | — | — | 10.5 | — | — |
| A₁ + diflufenican | 45 + 75 | 77.2 | 57.5 | 19.7 | 66.1 | 47.8 | 18.3 |
| | 45 + 150 | 81.8 | 58.5 | 23.3 | 66.2 | 50.2 | 16.0 |
| | 45 + 300 | 83.2 | 58.9 | 24.3 | 68.3 | 51.4 | 16.9 |
| | 90 + 75 | 93.1 | 83.4 | 9.7 | 83.3 | 82.3 | 1.0 |
| | 90 + 150 | 95.3 | 83.8 | 11.5 | 89.1 | 83.1 | 6.0 |
| | 90 + 300 | 96.2 | 83.9 | 12.3 | 93.6 | 83.5 | 10.1 |
| | 180 + 75 | 100 | 100.0 | 0.0 | 100 | 100.0 | 0.0 |
| | 180 + 150 | 100 | 100.0 | 0.0 | 100 | 100.0 | 0.0 |
| | 180 + 300 | 100 | 100.0 | 0.0 | 100 | 100.0 | 0.0 |

TABLE 13

Actual control effect and combined effect of a combination of A and amicarbazone on weeds (Gowing method)

| agents | dosage of active ingredient (g/hm²) | *Chenopodium album* | | | *Amaranthus retroflexus* | | |
|---|---|---|---|---|---|---|---|
| | | actual fresh weight inhibition rate (%) | theoretical fresh weight inhibition rate (%) | E − E0 | actual fresh weight inhibition rate (%) | theoretical fresh weight inhibition rate (%) | E − E0 |
| A₁ | 45 | 19.1 | — | — | 45.7 | — | — |
| | 90 | 30.2 | — | — | 81.6 | — | — |
| | 180 | 48.7 | — | — | 100 | — | — |

TABLE 13-continued

Actual control effect and combined effect of a combination of A and amicarbazone on weeds (Gowing method)

|  |  | Chenopodium album | | | Amaranthus retroflexus | | |
|---|---|---|---|---|---|---|---|
| agents | dosage of active ingredient (g/hm$^2$) | actual fresh weight inhibition rate (%) | theoretical fresh weight inhibition rate (%) | E − E0 | actual fresh weight inhibition rate (%) | theoretical fresh weight inhibition rate (%) | E − E0 |
| amicarbazone | 112.5 | 36.5 | — | — | 21.6 | — | — |
|  | 225 | 45.9 | — | — | 31.9 | — | — |
|  | 450 | 64.3 | — | — | 41.8 | — | — |
| A$_1$ + amicarbazone | 45 + 112.5 | 69.3 | 48.6 | 20.7 | 76.9 | 57.4 | 19.5 |
|  | 45 + 225 | 72.1 | 56.2 | 15.9 | 79.8 | 63.0 | 16.8 |
|  | 45 + 450 | 83.4 | 71.1 | 12.3 | 83.7 | 68.4 | 15.3 |
|  | 90 + 112.5 | 72.2 | 55.7 | 16.5 | 100 | 85.6 | 14.4 |
|  | 90 + 225 | 80.3 | 62.2 | 18.1 | 100 | 87.5 | 12.5 |
|  | 90 + 450 | 87.2 | 75.1 | 12.1 | 100 | 89.3 | 10.7 |
|  | 180 + 112.5 | 85.2 | 67.4 | 17.8 | 100 | 100.0 | 0.0 |
|  | 180 + 225 | 83.1 | 72.2 | 10.9 | 100 | 100.0 | 0.0 |
|  | 180 + 450 | 86.9 | 81.7 | 5.2 | 100 | 100.0 | 0.0 |

C. Pilot Sites

Tests using the herbicidal compositions prepared in Examples 1) to 21) to control weeds in cornfields.

In 2014, a demonstration popularization test was conducted at 25 pilot sites in 5 corn areas in Dezhou in Shandong Province, SuiHua in Heilongjiang Province, Gongzhuling in Jilin Province, Shenyang in Liaoning Province and Baoding in Hebei Province. Corn varieties in different demonstration areas were shown in Table 14.

TABLE 14

Corn varieties in different demonstration areas

| Demonstration area | Corn variety |
|---|---|
| Dezhou in Shandong Province | Denghai series |
| SuiHua in Heilongjiang Province | Xianyu 335 |
| Gongzhuling in Jilin Province | Huayu series |
| Shenyang in Liaoning Province | Liyu series |
| Baoding in Hebei Province | Zhengdan 958 |

Experimental methods: In the stage of 3 leaves and 1 core of the corn and 3-5 leaves of the weed, the agent was evenly sprayed on stems and leaves through a manual sprayer, wherein the amount of added water was 15 kg/667 m$^2$, the specific tested agents and dosage thereof were shown in Table 15. The area of the pilot site was 50 square meters, and each treatment was repeated for 4 times. The weed control efficiency after 45 days of application was shown in Table 15, and the safety of corn was shown in Table 16.

$$\text{Weed control efficiency (\%)} = \frac{\text{number of weed strains in the water control area} - \text{number of weed strains in the area treated with agents}}{\text{number of weed strains in the water control area}}$$

TABLE 15

Controlling effect in pilot sites

| | dosage | Weed control efficiency in different pilot sites (%) | | | | |
|---|---|---|---|---|---|---|
| Agents | (g a.i./ha) | Dezhou | Suihua | Gongzhuling | Shenyang | Baoding |
| Example 1) (56% OD) | 840 | 91.3 | 90.7 | 91.4 | 89.9 | 90.7 |
| Example 2) (28% OD) | 840 | 92.5 | 90.2 | 91.5 | 91.2 | 90.4 |
| Example 3) (26% OD) | 390 | 92.4 | 91.6 | 92.4 | 92.0 | 90.5 |
| Example 4) (13% OD) | 390 | 92.0 | 90.5 | 93.8 | 90.0 | 91.8 |
| Example 5) (56% OD) | 840 | 91.3 | 91.3 | 91.2 | 90.8 | 90.2 |
| Example 6) (28% OD) | 840 | 88.8 | 95.5 | 92.4 | 90.5 | 88.5 |
| Example 7) (8% OD) | 120 | 90.9 | 89.6 | 87.1 | 86.2 | 84.8 |
| Example 8) (4.5% OD) | 105 | 92.7 | 90.2 | 87.5 | 87.5 | 86.6 |
| Example 9) (16% OD) | 240 | 97.3 | 94.9 | 88.6 | 92.2 | 92.4 |
| Example 10) (18% OD) | 540 | 90.4 | 92.5 | 93.7 | 95.8 | 93.4 |
| Example 11) (3.5% OD) | 180 | 88.0 | 88.4 | 85.5 | 88.7 | 84.6 |
| Example 12) (21% OD) | 315 | 91.3 | 92.7 | 89.3 | 88.6 | 89.3 |
| Example 13) (56% SC) | 840 | 91.0 | 93.3 | 89.9 | 96.3 | 91.2 |
| Example 14) (16% SC) | 240 | 89.3 | 91.5 | 92.2 | 90.8 | 94.4 |
| Example 15) (56% SC) | 840 | 92.3 | 91.7 | 90.2 | 88.9 | 87.7 |
| Example 16) (26% SC) | 390 | 93.5 | 97.2 | 97.5 | 91.2 | 90.6 |

TABLE 15-continued

Controlling effect in pilot sites

| Agents | dosage (g a.i./ha) | Weed control efficiency in different pilot sites (%) | | | | |
|---|---|---|---|---|---|---|
| | | Dezhou | Suihua | Gongzhuling | Shenyang | Baoding |
| Example 17) (56% WDG) | 840 | 92.8 | 91.6 | 92.4 | 87.0 | 90.5 |
| Example 18) (56% WDG) | 840 | 94.0 | 90.5 | 89.8 | 97.0 | 91.8 |
| Example 19) (56% WDG) | 840 | 91.3 | 94.3 | 91.9 | 89.8 | 90.2 |
| Example 20) (56% WDG) | 840 | 93.5 | 97.2 | 97.5 | 91.2 | 90.6 |
| Example 21) (63% WDG) | 315 | 96.1 | 93.3 | 94.2 | 87.2 | 88.8 |
| Dispersible oil suspension of 10% active ingredient $A_1$ | 90 | 82.8 | 79.6 | 82.4 | 86.0 | 80.5 |
| Dispersible oil suspension of 10% active ingredient $A_2$ | 90 | 79 | 76.1 | 85.4 | 82.3 | 84.2 |
| Dispersible oil suspension of 10% active ingredient $A_3$ | 90 | 84.5 | 81.5 | 79.1 | 81.9 | 82.7 |
| Suspension of 50% atrazine | 112.50 | 14.4 | 12.6 | 16.3 | 19.3 | 14.2 |
| Suspension of 50% metribuzin | 300 | 14.4 | 12.6 | 16.3 | 19.3 | 14.2 |
| Suspension of 50% terbuthylazine | 112.50 | 13.7 | 10.9 | 16.8 | 18.3 | 13.9 |
| water-dispersible granule of 50% diflufenican | 150 | 14.4 | 12.6 | 16.3 | 19.3 | 14.2 |
| Dispersible oil suspension of 4% nicosulfuron | 60 | 83.7 | 80.9 | 86.8 | 88.3 | 83.9 |
| Dispersible oil suspension of 10% halosulfuron-methyl | 45 | 14.4 | 12.6 | 16.3 | 19.3 | 14.2 |
| 200 g/L Emulsifiable concentrate of fluroxypyr | 120 | 52.8 | 59.6 | 52.4 | 46.0 | 40.5 |
| 480 g/L Emulsifiable concentrate of dicamba | 150 | 34.4 | 62.6 | 66.3 | 59.3 | 54.2 |
| 480 g/L Aqueous solution of bentazone | 300 | 34.4 | 32.6 | 26.3 | 29.3 | 24.2 |
| Emulsifiable concentrate of 25% bromoxynil octanoate | 300 | 20.7 | 27.5 | 20.3 | 23.9 | 28.4 |
| Emulsifiable concentrate of 50% butachlor | 112.50 | 1.4 | 1.6 | 1.3 | 1.3 | 1.2 |
| Emulsifiable concentrate of 96% s-metolachlor | 112.50 | 2.7 | 1.9 | 1.8 | 1.3 | 2.9 |
| Water-dispersible granule 70% amicarbazone | 225 | 21.2 | 23.4 | 24.1 | 25.1 | 24.9 |
| Water control (CK) | — | — | — | — | — | — |

TABLE 16

Safety of the corn in the pilot sites

| Agents | dosage (g a.i./ha) | Safety of the corn | | | | |
|---|---|---|---|---|---|---|
| | | Dezhou | Suihua | Gongzhuling | Shenyang | Baoding |
| Example 1) (56% OD) | 840 | safety | safety | safety | safety | safety |
| Example 2) (28% OD) | 840 | safety | safety | safety | safety | safety |
| Example 3) (26% OD) | 390 | safety | safety | safety | safety | slight scorched |
| Example 4) (13% OD) | 390 | slight scorched | safety | safety | safety | safety |
| Example 5) (56% OD) | 840 | safety | safety | safety | safety | safety |

TABLE 16-continued

Safety of the corn in the pilot sites

| Agents | dosage (g a.i./ha) | Dezhou | Suihua | Gongzhuling | Shenyang | Baoding |
|---|---|---|---|---|---|---|
| Example 6) (28% OD) | 840 | safety | safety | safety | safety | safety |
| Example 7) (8% OD) | 120 | safety | safety | safety | safety | safety |
| Example 8) (4.5% OD) | 105 | safety | safety | safety | safety | safety |
| Example 9) (16% OD) | 240 | safety | safety | safety | safety | safety |
| Example 10) (18% OD) | 540 | safety | safety | safety | safety | safety |
| Example 11) (3.5% OD) | 180 | safety | safety | safety | safety | safety |
| Example 12) (21% OD) | 315 | safety | safety | slight scorched | safety | safety |
| Example 13) (56% SC) | 840 | safety | safety | safety | safety | safety |
| Example 14) (16% SC) | 240 | safety | safety | safety | safety | safety |
| Example 15) (56% SC) | 840 | safety | safety | safety | safety | safety |
| Example 16) (26% SC) | 390 | safety | safety | safety | safety | slight scorched |
| Example 17) (56% WDG) | 840 | safety | safety | safety | safety | safety |
| Example 18) (56% WDG) | 840 | safety | safety | safety | safety | safety |
| Example 19) (56% WDG) | 840 | safety | safety | safety | safety | safety |
| Example 20) (56% WDG) | 840 | safety | safety | safety | safety | safety |
| Example 21) (63% WDG) | 315 | safety | safety | safety | safety | safety |
| Dispersible oil suspension of 10% active ingredient $A_1$ | 90 | safety | safety | safety | safety | safety |
| Dispersible oil suspension of 10% active ingredient $A_2$ | 90 | safety | safety | safety | safety | safety |
| Dispersible oil suspension of 10% active ingredient $A_3$ | 90 | safety | safety | safety | safety | safety |
| Suspension of 50% atrazine | 112.50 | safety | safety | safety | safety | safety |
| Suspension of 50% metribuzin | 300 | slight scorched | safety | slight scorched | slight scorched | slight scorched |
| Suspension of 50% terbuthylazine | 112.50 | slight scorched | safety | slight scorched | slight scorched | slight scorched |
| water-dispersible granule of 50% diflufenican | 150 | safety | safety | safety | safety | safety |
| Dispersible oil suspension of 4% nicosulfuron | 60 | safety | safety | safety | safety | safety |
| Dispersible oil suspension of 10% halosulfuron-methyl | 45 | safety | safety | safety | safety | safety |
| 200 g/L Emulsifiable concentrate of fluroxypyr | 120 | safety | slightly curly | safety | slightly curly | safety |
| 480 g/L Emulsifiable concentrate of dicamba | 150 | slightly curled | slightly curly | slightly curly | slightly curly | slightly curly |
| 480 g/L Aqueous solution of bentazone | 300 | safety | safety | safety | safety | safety |
| Emulsifiable concentrate of 25% bromoxynil octanoate | 300 | slight scorched | slight scorched | slight scorched | slight scorched | slight scorched |
| Emulsifiable concentrate of 50% butachlor | 112.50 | safety | safety | safety | safety | safety |
| Emulsifiable concentrate of 96% s-metolachlor | 112.50 | safety | safety | safety | safety | safety |
| Water-dispersible granule 70% amicarbazone | 225 | slight scorched | slight scorched | slight scorched | slight scorched | slight scorched |
| Water control (CK) | — | — | — | — | — | — |

Note: types of the weed community in each of the demonstration areas were as follows: Dezhou: *Echinochloa crusgalli+Setaria virdis+Digitaria sanguinalis+Chenopodium album+Amaranthus retroflexus;* Suihua: *Echinochloa crusgalli+Setaria virdis+Abutilon avicennae+Xanthium sibiricum+Chenopodium album+Amaranthus retroflexus;* Gongzhuling: *Echinochloa crusgalli+Setaria virdis+Abutilon avicennae+Xanthium sibiricum+Commelina communica;* Shenyang: *Echinochloa crusgalli+Setaria virdis+Eriochloa+Panicum miliaceum;* and Baoding: *Echinochloa crusgalli+Setaria virdis+Digitaria sanguinalis+Amaranthus retroflexus+Chenopodium* album.

After making extensive experimentations and explorations, the present inventors have unexpectedly discovered that when a mixture of a compound A, an active ingredient B and a safener compound C is used for the control of Gramineae weeds for postemergence application in cornfields, surprising and unexpected synergistic effects are achieved, especially the mixture exhibits significantly synergistic effects on the control of Gramineae weeds such as *Echinochloa crusgalli* and *Setaria viridis*, broad-leaf weeds such as *Chenopodium* album, *Abutilon avicennae*, and *Convolvulus arvernsis*, and Gyperaceae weeds such as *Rhizoma Cyperi* etc., thereby reducing application dose, being safe for corns and reducing environmental pollution, and the rational compounding leads to reduced agricultural costs and highly effective control of weeds resistant to ALS inhibitors. The inventive compositions have a good application prospect.

The invention claimed is:

1. A cornfield herbicidal composition comprising an herbicidally effective amount of an active ingredient A and an active ingredient B, wherein, the active ingredient A is a compound of the formula

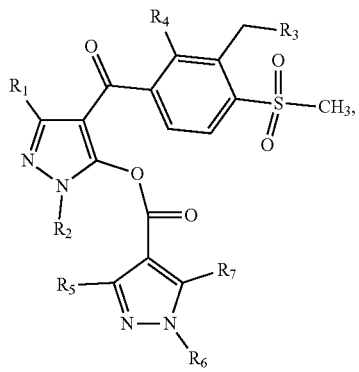

wherein
$R_1$ is hydrogen atom, methyl, ethyl, or cyclopropyl;
$R_2$ is methyl, ethyl, or isopropyl;
$R_3$ is ethoxy, 2-fluoroethoxy, 2,2-difluoroethoxy, or 2,2,2-trifluoroethoxy;
$R_4$ is chlorine atom or methyl; and
$R_5$, $R_6$ and $R_7$ are hydrogen atom, alkyl, alkoxy, halogen, halogen-substituted alkyl or a halogen-substituted alkoxy;
the active ingredient B is selected from one or more of the following compounds:
1) a trazine selected from the group consisting of atrazine, metribuzin, and terbuthylazine;
2) a nitrile selected from the group consisting of bromoxynil, bromoxynil octanoate, and iodobenzonitrile;
3) a sulfonylurea selected from the group consisting of nicosulfuron, halosulfuron-methyl, foramsulfuron, and rimsulfuron;
4) a pyridine carboxylic acid selected from the group consisting of fluroxypyr, fluroxypyr-mepthyl, halauxifen-methyl, triclopyr, and clopyralid;
5) a benzyl carboxylic acid selected from dicamba;
6) bentazone;
7) an amide selected from the group consisting of acetochlor, butachlor, alachlor, propisochlor, and metolachlor;
8) pyridines: diflufenican, and picolinafen; and
9) amicarbazone.

2. The cornfield herbicidal composition according to claim 1, wherein in the active ingredient A, $R_1$ is hydrogen atom; $R_2$ is methyl or ethyl; $R_3$ is ethoxy, 2-fluoroethoxy, 2,2-difluoroethoxy or 2,2,2-trifluoroethoxy; $R_4$ is chlorine atom; $R_5$, $R_6$, $R_7$ are hydrogen atom, alkyl, alkoxy, halogen, halogen-substituted alkyl or halogen-substituted alkoxy; and the active ingredient B is one or more of atrazine, metribuzin, terbuthylazine, bromoxynil octanoate, nicosulfuron, halosulfuron-methyl, fluroxypyr, halauxifen-methyl, dicamba, bentazone, butachlor, propisochlor, s-metolachlor, diflufenican, and amicarbazone.

3. The cornfield herbicidal composition according to claim 1, wherein in the active ingredient A, $R_1$ is hydrogen atom; $R_2$ is methyl or ethyl; $R_3$ is ethoxy, 2,2-difluoroethoxy or 2,2,2-trifluoroethoxy; $R_4$ is chlorine atom; $R_5$ is methyl; $R_6$ is methyl; and $R_7$ is hydrogen atom.

4. The cornfield herbicidal composition according to claim 1, wherein the A and B of the herbicidal composition has a weight ratio of 1-100: 1-100.

5. The cornfield herbicidal composition according to claim 1, wherein the herbicidal composition further comprises a conventional pesticide adjuvant.

6. The cornfield herbicidal composition according to claim 5, wherein the conventional pesticide adjuvant comprises a carrier or a surfactant.

7. The cornfield herbicidal composition according to claim 1, wherein the herbicidal composition is in a specific dosage form of wettable powder, dispersible oil suspension, suspension, suspoemulsion, emulsifiable concentrate, water-dispersible granule, aqueous emulsion, or microemulsion.

8. The cornfield herbicidal composition according to claim 1, wherein the A and B of the herbicidal composition has a weight ratio of 1-30: 1-30.

9. The cornfield herbicidal composition according to claim 1, wherein the A and B of the herbicidal composition has a weight ratio of 1-20: 1-20.

10. The cornfield herbicidal composition according to claim 1, wherein the cornfield herbicidal composition further comprises a safener compound C selected from one or more of the following compounds:
C1: isoxadifen-ethyl,
C2: cyprosulfamide,
C3: mefenpyr-diethyl,
C4: cloquintocet-mexyl,
C5: gibberellic acid,
C6: furilazole and
C7: N-(2-methoxybenzoyl)-4-[(methylaminocarbonyl)amino]benzenesulfonamide.

11. The cornfield herbicidal composition according to claim 10, wherein the A, B and C together account for 1-95% of the total weight of the herbicidal composition.

12. The cornfield herbicidal composition according to claim 10, wherein the A, B and C together account for 10-80% of the total weight of the herbicidal composition.

13. The cornfield herbicidal composition according to claim 10, wherein the A, B and C of the herbicidal composition has a weight ratio of 1-100: 1-100: 1-100.

14. The cornfield herbicidal composition according to claim 12, wherein the A, B and C of the herbicidal composition has a weight ratio of 1-30: 1-30: 1-30.

15. The cornfield herbicidal composition according to claim 12, wherein the A, B and C of the herbicidal composition has a weight ratio of 1-20: 1-20: 1-20.

16. The cornfield herbicidal composition according to claim 1, wherein in the active ingredient A, $R_1$ is hydrogen atom; $R_2$ is ethyl; $R_3$ is 2, 2, 2-trifluoroethoxy; $R_4$ is chlorine atom; $R_5$ is methyl; $R_6$ is methyl; and $R_7$ is hydrogen atom; or wherein in the active ingredient A, $R_1$ is hydrogen atom; $R_2$ is methyl; $R_3$ is 2,2-difluoroethoxy;

$R_4$ is chlorine atom; $R_5$ is methyl; $R_6$ is methyl; and $R_7$ is hydrogen atom; or wherein in the active ingredient A, $R_1$ is hydrogen atom; $R_2$ is ethyl; $R_3$ is ethoxy; $R_4$ is chlorine atom; $R_5$ is methyl; $R_6$ is methyl; and $R_7$ is hydrogen atom.

17. A method for controlling harmful weeds in a cornfield, comprising administering a cornfield herbicidal composition according to claim 1 to the cornfield.

18. A method for controlling harmful weeds in a cornfield, comprising administering a cornfield herbicidal composition according to claim 10 to the cornfield.

* * * * *